(12) United States Patent
Yoshida

(10) Patent No.: US 7,375,876 B2
(45) Date of Patent: May 20, 2008

(54) OPTICAL TRANSMITTING APPARATUS HAVING VARIABLE OPTICAL TRANSMITTING UNIT INCLUDING PLURALITY OF PATHS

(75) Inventor: Fumisato Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/311,394

(22) Filed: Dec. 20, 2005

(65) Prior Publication Data
US 2008/0094692 A1    Apr. 24, 2008

(30) Foreign Application Priority Data
Dec. 21, 2004   (JP)   .............. 2004-369982

(51) Int. Cl.
*H01S 4/00*      (2006.01)
*H04B 10/12*   (2006.01)

(52) U.S. Cl. .............. 359/341.41; 359/337.1; 359/337.11; 359/337.13

(58) Field of Classification Search .............. 359/337.1–337.13, 341.41; 398/160
See application file for complete search history.

(56) References Cited

U.S. PATENT DOCUMENTS

| | | | |
|---|---|---|---|
| 5,963,291 A * | 10/1999 | Wu et al. ............ | 349/196 |
| 6,008,932 A * | 12/1999 | Luo et al. ............ | 359/337 |
| 6,049,413 A * | 4/2000 | Taylor et al. ........ | 359/337 |
| 6,215,581 B1 * | 4/2001 | Yadlowsky ........... | 359/337 |
| 6,307,667 B1 * | 10/2001 | Liang .................. | 359/337 |
| 6,421,170 B1 * | 7/2002 | Krol et al. ............ | 359/337.1 |
| 6,529,319 B2 * | 3/2003 | Youn et al. ........... | 359/341.41 |
| 6,687,045 B2 * | 2/2004 | Lelic ..................... | 359/337.1 |
| 6,690,506 B2 * | 2/2004 | Zahnley et al. ...... | 359/337.11 |
| 6,781,736 B2 * | 8/2004 | Hoyt et al. ........... | 359/256 |
| 2002/0122251 A1 * | 9/2002 | DeBoynton et al. ... | 359/484 |
| 2003/0021009 A1 * | 1/2003 | MacCormack et al. | 359/337 |
| 2003/0151811 A1 * | 8/2003 | Helbing ............... | 359/484 |
| 2004/0196876 A1 * | 10/2004 | Katagirl et al. ....... | 372/23 |
| 2005/0111847 A1 * | 5/2005 | Jasti et al. ............ | 398/147 |

FOREIGN PATENT DOCUMENTS

| | | | |
|---|---|---|---|
| DE | 10158743 A1 | * | 6/2003 |
| GB | 2349287 A | * | 10/2000 |
| JP | 2001-144352 A | | 5/2001 |
| JP | 2003-258346 A | | 9/2003 |

* cited by examiner

*Primary Examiner*—Deandra M. Hughes
*Assistant Examiner*—Eric Bolda
(74) *Attorney, Agent, or Firm*—Sughrue Mion, PLLC

(57) ABSTRACT

An optical transmitting apparatus includes a variable optical attenuating unit for attenuating signal light variably, an optical amplifying unit for amplifying the signal light, and a looped optical circuit for returning the signal light from the optical amplifying unit to the variable optical attenuating unit. The variable optical attenuating unit further attenuates the returned signal light variably.

22 Claims, 18 Drawing Sheets ly, when the signal light B is inputted, an attenuation of 10 dB needs to be given by the variable optical attenuator because the signal power is higher by 10 dB than the input level in steady state shown in FIG. 14.

OPTICAL TRANSMITTING APPARATUS HAVING VARIABLE OPTICAL TRANSMITTING UNIT INCLUDING PLURALITY OF PATHS

BACKGROUND OF THE INVENTION

1. Field of the Invention

The present invention relates to optical transmitting technique, and in particular, to an optical transmitting apparatus and optical control method of amplifying signal light.

2. Description of the Related Art

In an optical communication system, a wavelength division multiplexing (WDM) communication for increasing communication capacity has prevailed. Therefore, development of a WDM transmitting apparatus has been very brisk. The WDM transmitting apparatus has used an optical-fiber amplifier to extend communication distance by amplifying directly a WDM optical signal. Most optical-fiber amplifiers as a whole have been used to maintain an output level constant. However, due to an optical-fiber amplifying unit therein keeping gain constant, the flatness of an outputted signal light becomes difficult to receive influence. For that reason, the output of the entire optical fiber amplifier needs to be maintained constant, irrespective of change in input level with the gain of the amplifier kept constant.

As the related art, a configuration in which an optical amplifier is provided with a variable optical attenuator is known, as shown in "Japanese Patent Laid-Open No. 2001-144352," pp. 3 to 5, FIG. 2. In this invention, a variable optical attenuator is inserted between optical amplifying units. By adjusting the attenuation in the variable optical attenuator, the output of the optical amplifier is kept constant even if an input level changes.

FIG. 13 shows the related art. First, signal light inputted into an optical amplifier 200 is amplified by a first amplifying unit 21, attenuated by a variable optical attenuator 24 to a specified level, and outputted. Next, the signal light is again amplified by a second amplifying unit 22, passed through a gain equalizer 25 and a dispersion compensator 26, further amplified by a third amplifying unit 23, and outputted from the optical amplifier 200.

The related art, however, has the following problem.

When the input level of the signal light changes greatly, attenuation in the variable optical attenuator 24 needs increasing. This causes loss to concentrate in one point on a signal path. Concentration of loss in one point lowers the level of the signal at the point. Amplifying the lowered signal light by the optical amplifying unit of the next stage increases the quantity of amplified spontaneous emission (ASE) light. Consequently, an increase of the ASE light causes the noise figure (NF) to deteriorate.

This deterioration is described in detail with reference to FIGS. 14 to 17. FIG. 14 shows an example of a spectrum of signal light inputted into an optical amplifier, of which input level is in steady state. FIG. 15 shows gain and noise figure (NF) value with respect to wavelengths of the amplified signal lights. Next, FIG. 16 shows the cases where the signal lights with two different input levels are input to the optical amplifier by change in input level. When the signal light A is inputted, an attenuation of 5 dB needs to be given by the variable optical attenuator because the signal power is higher by 5 dB than the input level in steady state shown in FIG. 14. Similarly, when the signal light B is inputted, an attenuation of 10 dB needs to be given by the variable optical attenuator because the signal power is higher by 10 dB than the input level in steady state shown in FIG. 14.

FIG. 17 shows NF values versus wavelength of the amplified signal lights A and B. It shows that when the signal light B, in particular, is inputted, a loss of 10 dB concentrates in the variable optical attenuator, leading to deterioration in noise figure. Thus, the related art has a problem in that a greater change in the input level causes loss to concentrate, deteriorating noise figure.

Another related art has configuration in which a variable optical attenuator is disposed on a plurality of points on the signal path to prevent loss from concentrating, as shown in "Japanese Patent Laid-Open No. 2003-258346," pp. 3 to 9, FIG. 1. This disposition disperses loss.

FIG. 18 shows another related art. An optical amplifier 300 is provided with a plurality of gain controlling units 310 and 320. The gain controlling unit 310 has a variable optical attenuator 312 between two optical amplifying units 311 and 313. The gain controlling unit 320 has a variable optical attenuator 322 between two optical amplifying units 321 and 323. The optical amplifier 300 is equipped with an attenuation controlling unit 340 for controlling the variable optical attenuators and a targeted-gain setting unit 350 for controlling optical amplifying units. The attenuation controlling unit 340 controls attenuation of the variable optical attenuators 312 and 322 so that respective output levels of the gain controlling unit 310 at the front stage and the gain controlling unit 320 at the rear stage can be kept constant. The targeted-gain setting unit 350 distributes gain to a plurality of the optical amplifying units 313 and 323 so that noise figure can be optimized when variation arises in a level inputted into this apparatus and in loss quantity between the stages. Therefore, the targeted-gain setting unit 350 controls a second and a fourth optical amplifying units 313 and 323 by setting the optical amplifying units for targeted gains respectively so that the total gain of the four optical amplifiers 311, 313, 321, and 323 is kept constant.

The above related art, however, has the following problem.

In the art, attenuation is controlled separately for each of a plurality of the variable optical attenuators and amplification is controlled separately for each of a plurality of the optical amplifying units as well. That makes control very complicated. In addition, the amplifier needs a plurality of the variable optical attenuators, increasing the number of components, which requires much space for its installation.

SUMMARY OF THE INVENTION

An exemplary feature of the present invention is to provide an optical transmitting apparatus and optical control method capable of suppressing deterioration in noise figure by a simple configuration and control after signal light is amplified even when the input level of the signal light varies greatly.

An optical transmitting apparatus according to the present invention includes a variable optical attenuating unit for attenuating signal light variably, an optical amplifying unit for amplifying the signal light, and a looped optical circuit for returning the signal light from the optical amplifying unit to the variable optical attenuating unit. The variable optical attenuating unit further attenuates the returned signal light variably.

A method of amplifying signal light according to the present invention includes attenuating signal light variably in a variable optical attenuating unit, amplifying the signal light in an optical amplifying unit, returning the signal light from the optical amplifying unit to the variable optical attenuating unit, and further attenuating the signal light variably in the variable optical attenuating unit.

As described above, the optical transmitting apparatus and optical control method according to the present invention enable suppressing deterioration in noise figure by a simple configuration and control after signal light is amplified even when the input level of the signal light varies greatly.

BRIEF DESCRIPTION OF THE DRAWINGS

The exemplary aspects, features and advantages of the present invention will become more apparent from the following detailed description when taken in conjunction with the accompanying drawings wherein.

DETAILED DESCRIPTION OF THE EXEMPLARY EMBODIMENTS

To embody the present invention, more preferred embodiments are described below in detail with reference to the drawings. The embodiments described below show concrete examples that will give you a better understanding of the present invention, and the scope of the present invention is not limited to these embodiments.

An optical transmitting apparatus, variable optical attenuating unit, optical detecting unit, and gain equalizing unit set forth in the claims are shown embodied in an optical amplifier, variable optical attenuator, photodiode (PD) detector, and gain equalizer respectively. Those only show an example, and do not limit the scope of the present invention.

Figure 1:
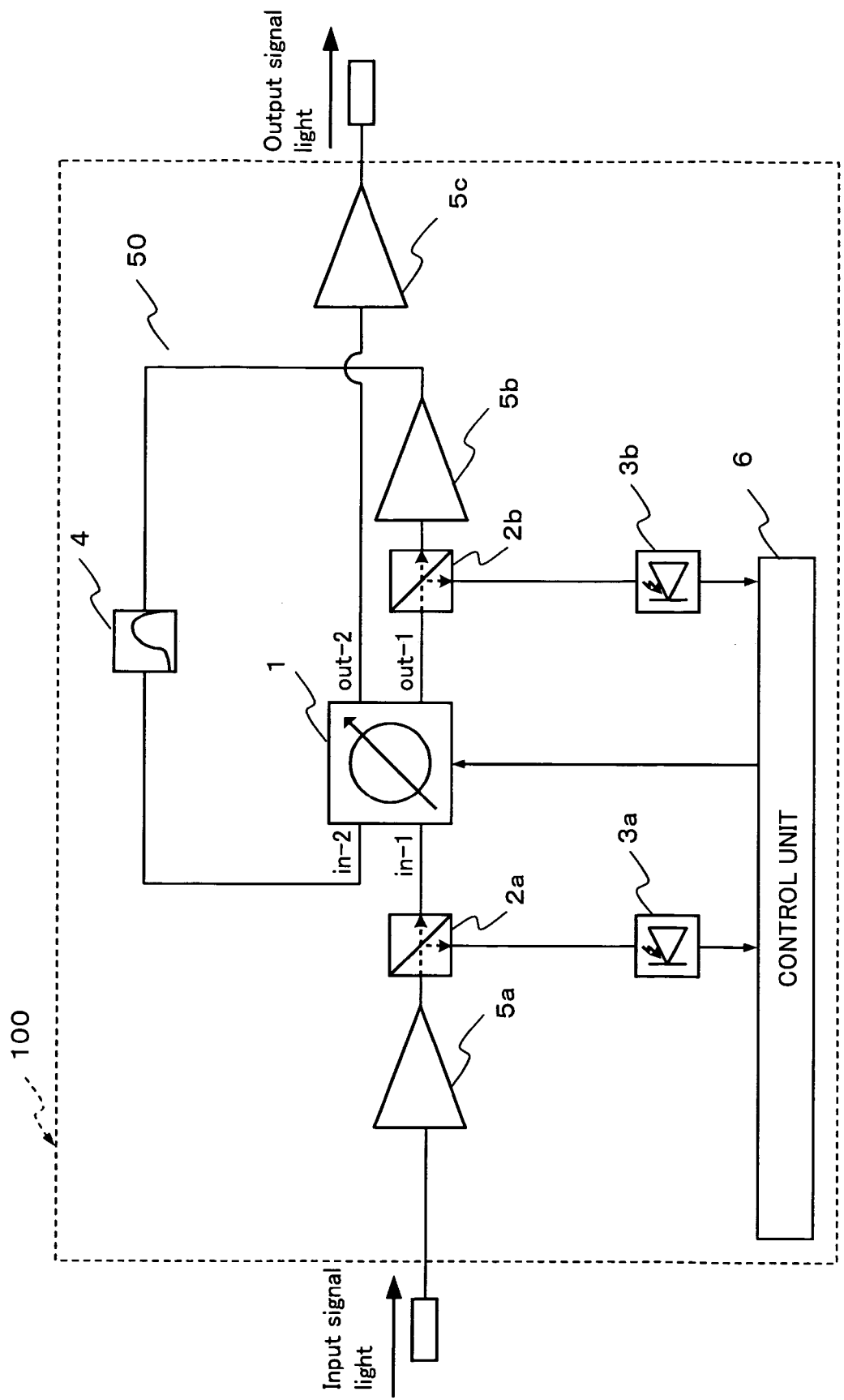
FIG. 1 shows an example of the configuration of an optical transmitting apparatus in a first exemplary embodiment of the present invention.
Figure 2:
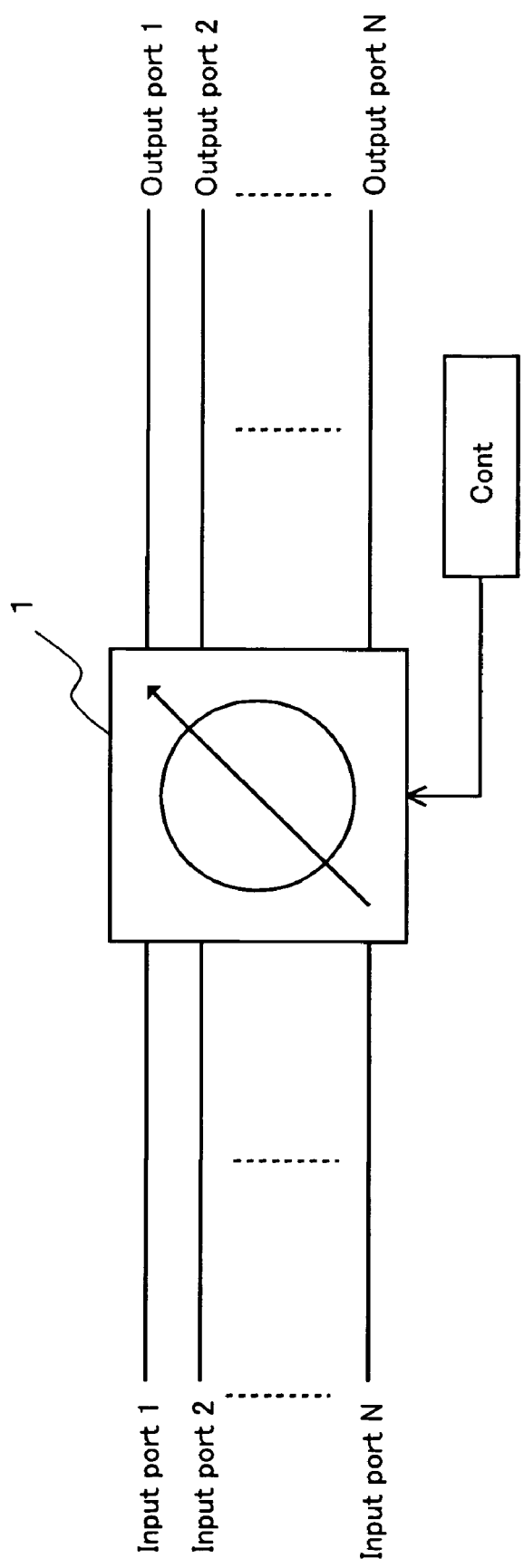
FIG. 2 shows an example of the general configuration of a variable optical attenuator used in the first exemplary embodiment.

FIG. 1 shows an example of the configuration of an optical amplifier 100 using a variable optical attenuator in a first exemplary embodiment according to the present invention. FIG. 2 shows an example of the general configuration of the variable optical attenuator used in the first exemplary embodiment. The following is a description with reference to the drawings.

The optical amplifier 100 in FIG. 1 is provided with a variable optical attenuator 1 for attenuating signal light, an optical amplifying unit 5b for amplifying the signal light, a looped optical circuit 50 for returning again the signal light from the optical amplifying unit 5b to the input section of the variable optical attenuator 1, and a control unit 6 of the variable optical attenuator for controlling attenuation of the variable optical attenuator 1. Further, the optical amplifier 100 has an optical amplifying unit 5a in the input section, an optical amplifying unit 5c in the output section, and a gain equalizer 4 in an intermediate position of the looped optical circuit 50.

Still further, the optical amplifier 100 has an optical branching coupler 2a and photodiode (PD) detector 3a for detecting the level of a signal inputted into the variable optical attenuator 1, and an optical branching coupler 2b and PD detector 3b for detecting the level of the signal outputted from the variable optical attenuator 1. The control unit 6 of the variable optical attenuator controls optical attenuation of the variable optical attenuator 1 based upon the detected results from the PD detectors 3a and 3b. The gain equalizer 4 with a profile directly opposed to the wavelength dependence of the gain of the optical amplifying units 5a, 5b, and 5c equalizes the gain of the transmission band.

The optical amplifying units 5a, 5b, and 5c are optical fiber type optical amplifiers, as one example. The units include rare-earth-doped optical fibers. As an additive therein erbium and praseodymium are primarily used. A semiconductor type optical amplifier may be used in place of the optical fiber type optical amplifier. The optical amplifying units are controlled so that the sum total of the gains can be kept constant, thereby maintaining the flatness of the gain constant. However, the control of the optical amplifier is not limited to that. For example, each of the optical amplifying units may be controlled by an Automatic Gain Control (AGC), or a part of the optical amplifying units may be controlled by an Automatic Level Control (ALC).

The variable optical attenuator 1 used here is equipped with a plurality of input and output ports as shown in FIG. 2. Each of the input and output ports corresponds to each other, forming a plurality of paths. For example, signal light inputted into the input port 1 is attenuated and outputted from the corresponding output port 1. Similarly, signal light inputted into the input port N ("N" is an integer of two or more) is attenuated and outputted from a corresponding output port N. Thus, the input and output ports with the same numbers form paths. Substantially equal optical attenuation is provided between all input and output ports. However, substantially equal optical attenuation is not necessarily required between all input and output ports. It is necessary only that optical attenuation is provided based on a given ratio between respective ports. That is to say, the adjustment of optical attenuation between arbitrary ports, for example, between the input port 1 and the output port 1, automatically determines optical attenuation between the ports 2 to ports N. In the first exemplary embodiment, the number of ports of the variable optical attenuator is at least two or more.

A concrete example of the variable optical attenuator used in the first exemplary embodiment is described below. The variable optical attenuator can be realized in the following configuration.

Figure 3:
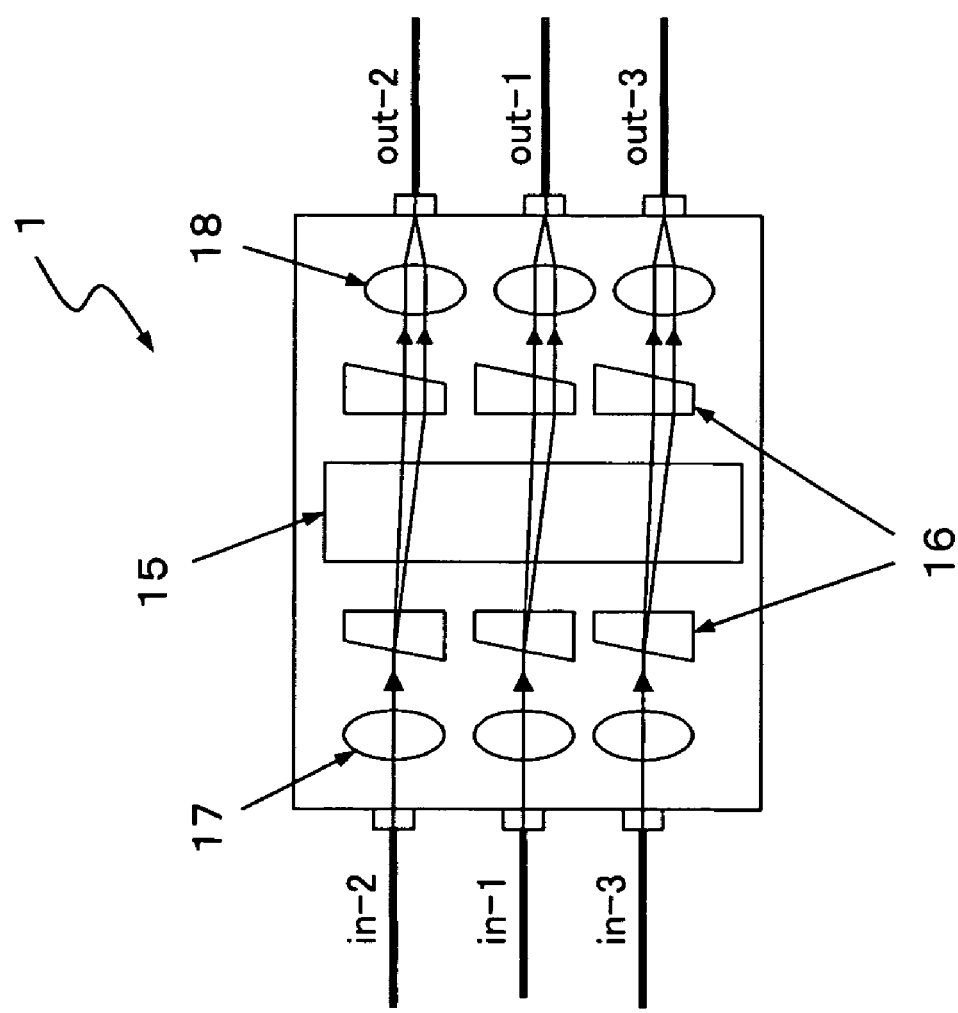
FIG. 3 shows an example of the detailed configuration of the variable optical attenuator used in the first exemplary embodiment.

FIG. 3, as a concrete example 1, shows an example using magneto-optics effect. The variable optical attenuator is equipped with a Faraday rotator 15 having a variable rotation angle, a wedged double refracting plate 16 serving as a double refracting prism, and condensing lenses 17 and 18. The Faraday rotator 15 is attached to all the ports as single variable means. The wedged double refracting plate 16 is attached to each port. Inputted light is divided into different polarized lights with the wedged double refracting plate 16 at the input side. The Faraday rotator 15 changes a polarizing angle of transmitted and polarized light with the magnitude of magnetic field applied in the direction where light is transmitted. This is called a "Faraday effect." Two separated polarized lights are condensed at the output port with wedged double refracting plate 16 at the output side and the condensing lens 18 at the output side and synthesized. The synthesized intensity varies with the rotation angle of the Faraday rotator, thereby adjusting attenuation. In the Faraday rotator, applying the same amount of magnetic field to a position corresponding to each port can variably provide each port with the same optical attenuation. The concrete example 1 is characterized by non polarization dependence, absence of moving part, and non-mechanical operation.

As a concrete example 2, transmission factor may be varied in such a manner that a voltage is applied to a liquid crystal layer provided between optical input and output ports arranged in parallel. The concrete example 2 has no moving part and is non-mechanically operable either.

In addition to that, as a concrete example 3, an optical attenuation filter distributing optical attenuation in one dimension can be provided between optical input and output ports arranged in parallel to mechanically move the optical attenuation filter. That can vary a light-transmission position, which makes optical attenuation between the ports variable. Furthermore, as a concrete example 4, same radius of curvature may be given to a plurality of optical fibers to provide the same bend loss therefor. It should be understood that means for varying attenuation of the variable optical attenuator is not limited to the above and optical control technique with use of various physical optics effects may be used.

As mentioned above, attenuation is not always the same between respective ports. It is necessary only that an attenuation ratio between respective ports should be known in advance. That makes it possible to obtain a total attenuation by the variable optical attenuator.

The operation of the first exemplary embodiment according to the present invention is described below with reference to FIG. 1. First, signal light inputted into the optical amplifier 100 is amplified by the optical amplifying unit 5a at the input side. Next, the signal light is partly branched by the optical branching coupler 2a and then inputted into the input port "in-1" of the variable optical attenuator 1. The signal light is attenuated therein and outputted from the output port "out-1." Subsequently, the signal light is partly branched by the optical branching coupler 2b. Then, the signal lights partly branched by the optical branching couplers 2a and 2b are received by PDs 3a and 3b. The optical attenuation of the variable optical attenuator 1 is detected by the ratio of power received by the detectors. Next, major signal lights that have passed through the optical branching coupler 2b are amplified by the optical amplifying unit 5b and then returned again to the variable optical attenuator 1 via the looped optical circuit 50. If the gain equalizer 4 is provided in an intermediate position of the looped optical circuit 50, gain equalization of the signal light is performed. The returned signal light is inputted into the input port "in-2" of the variable optical attenuator 1, again attenuated, and outputted from the output port "out-2." Finally, the signal light is again amplified by the optical amplifying unit 5c and outputted from the optical amplifier 100.

Examples of characteristics in the present embodiment with signal lights having various levels inputted are shown in FIGS. 4 to 9.

Figure 4:
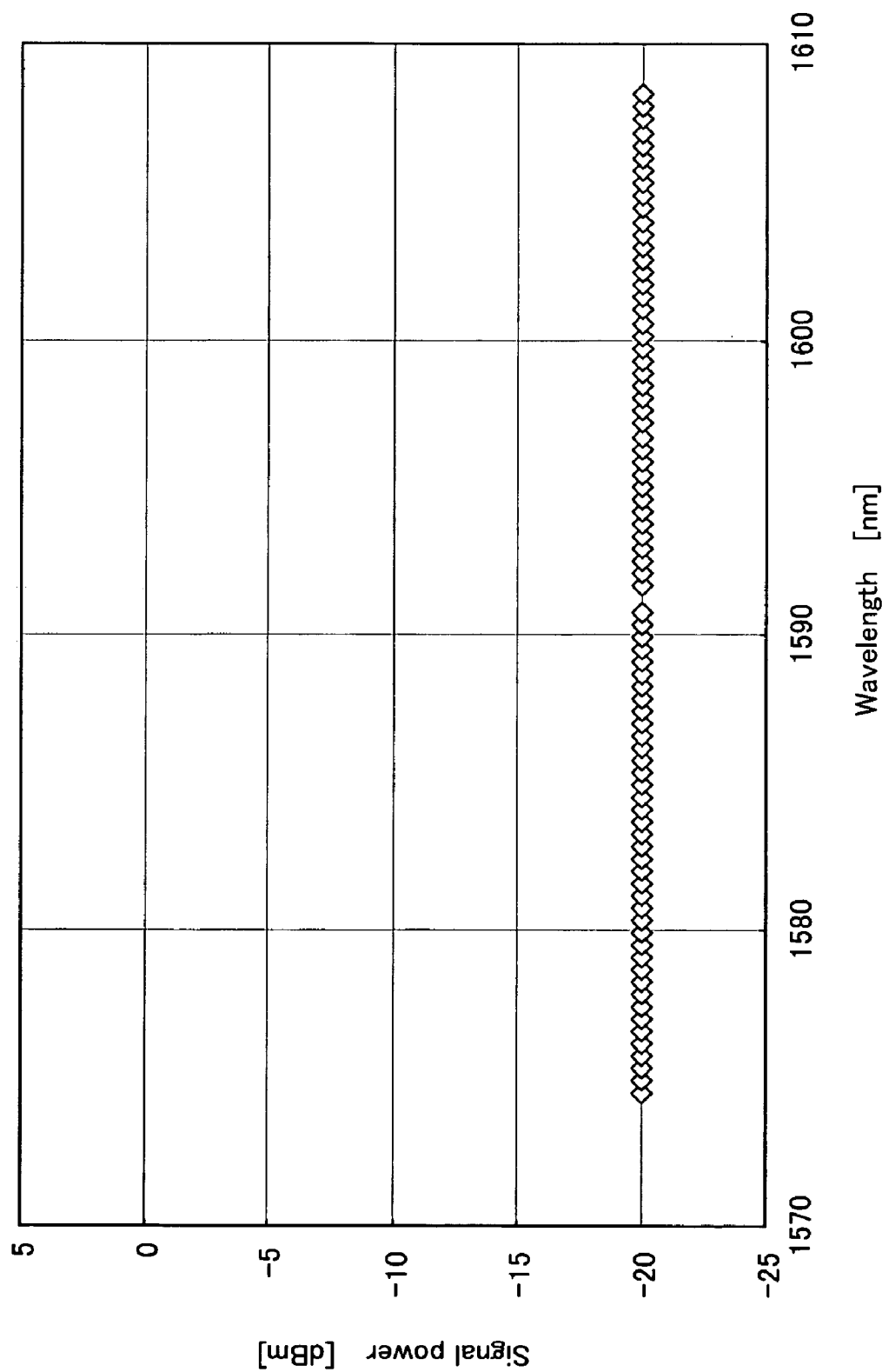
FIG. 4 shows an example of a spectrum of input signals in steady state.
Figure 5:
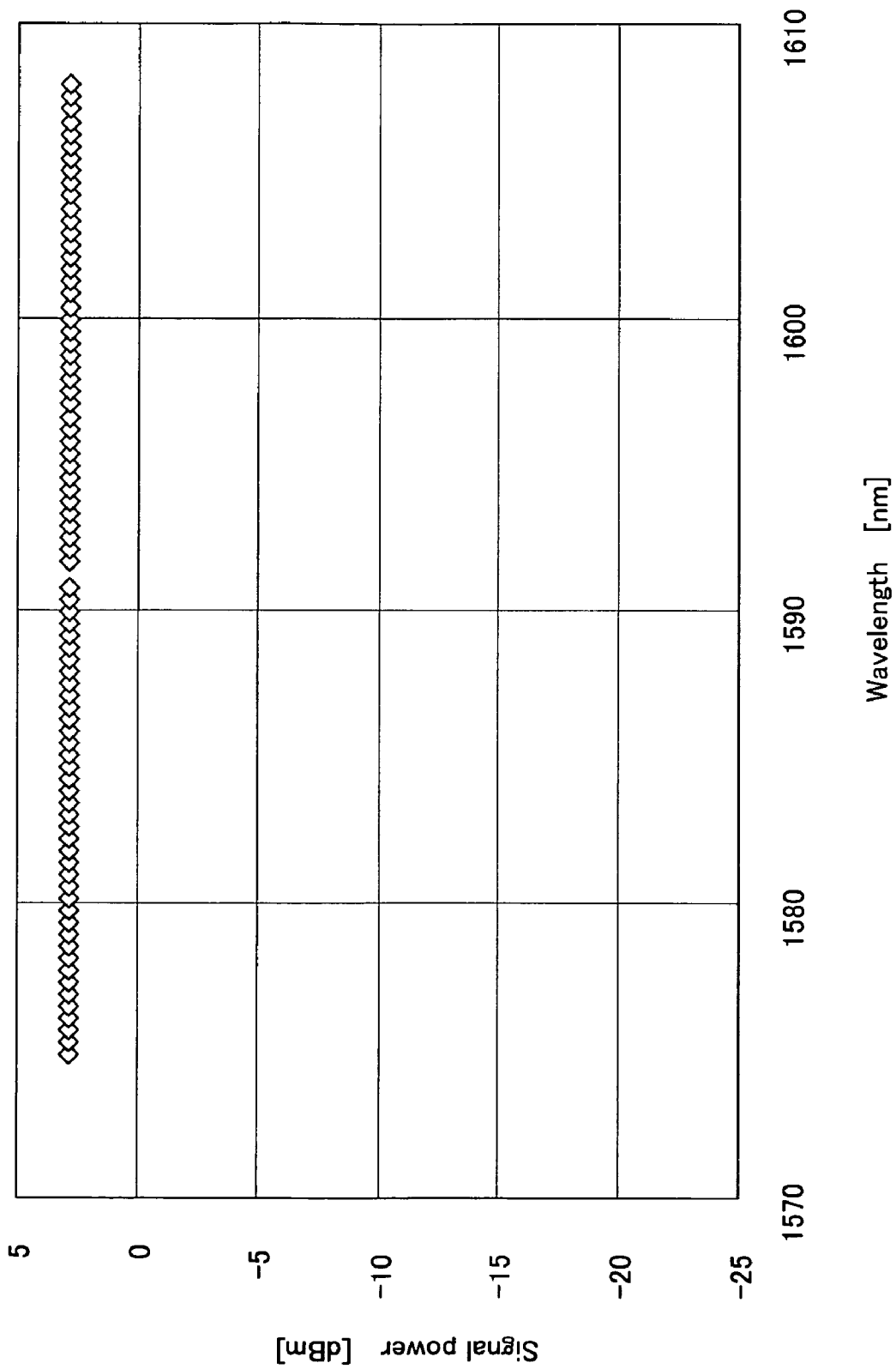
FIG. 5 shows an example of a spectrum of output signals in steady state.
Figure 6:
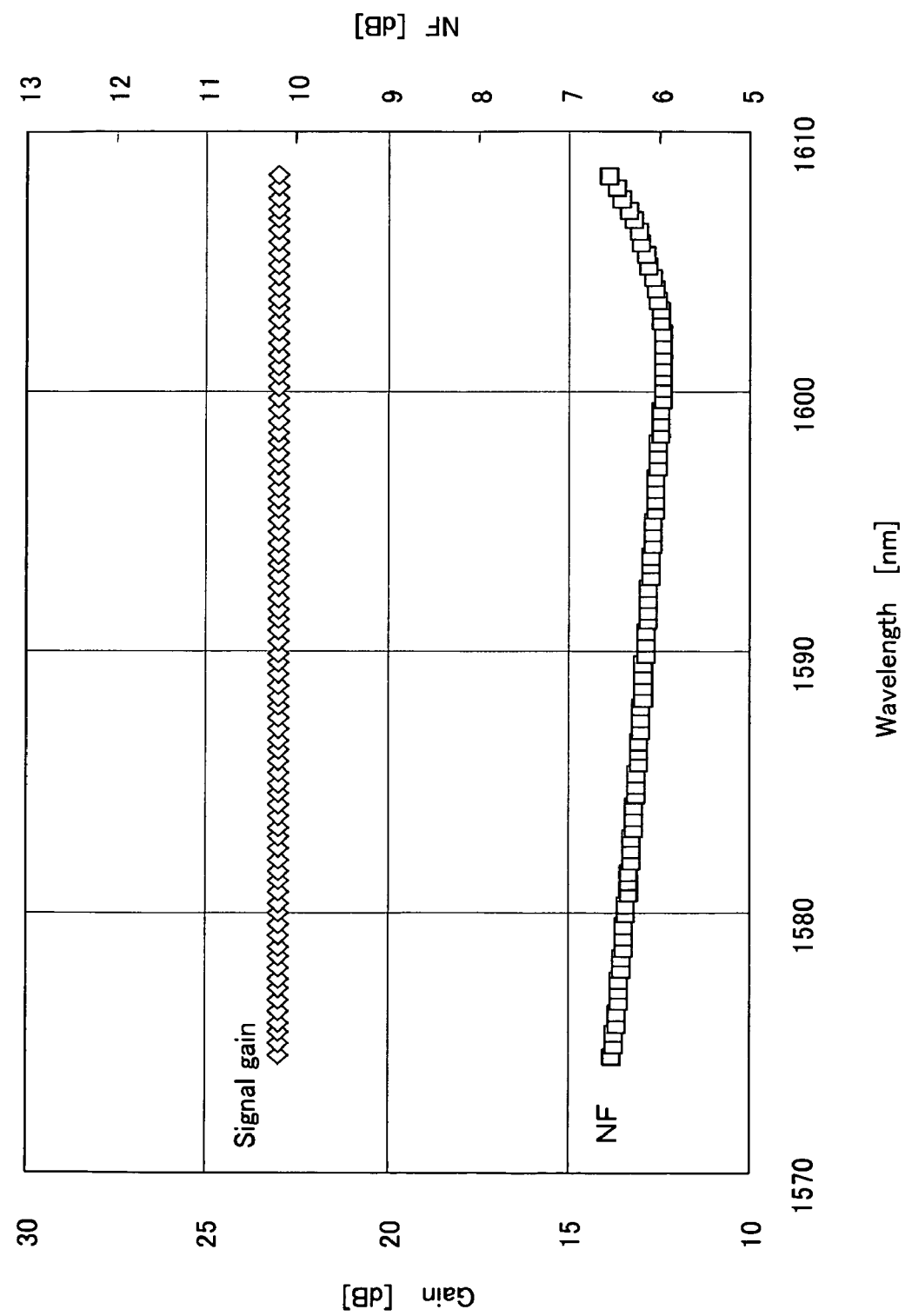
FIG. 6 shows an example of gain and NF value with respect to wavelengths of the output signals in steady state.

FIG. 4 shows an example of a spectrum of an inputted signal light in steady state. Optical attenuation of the variable optical attenuator 1 is set at an approximately intermediate value within the variable width of optical attenuation to be adapted to change in level of the inputted signal light. FIG. 5 shows an example of a spectrum of an outputted signal light observed when an inputted signal light in steady state is inputted. FIG. 6 shows gain and NF value with respect to the wavelengths of the outputted signal light in that case.

Figure 7:
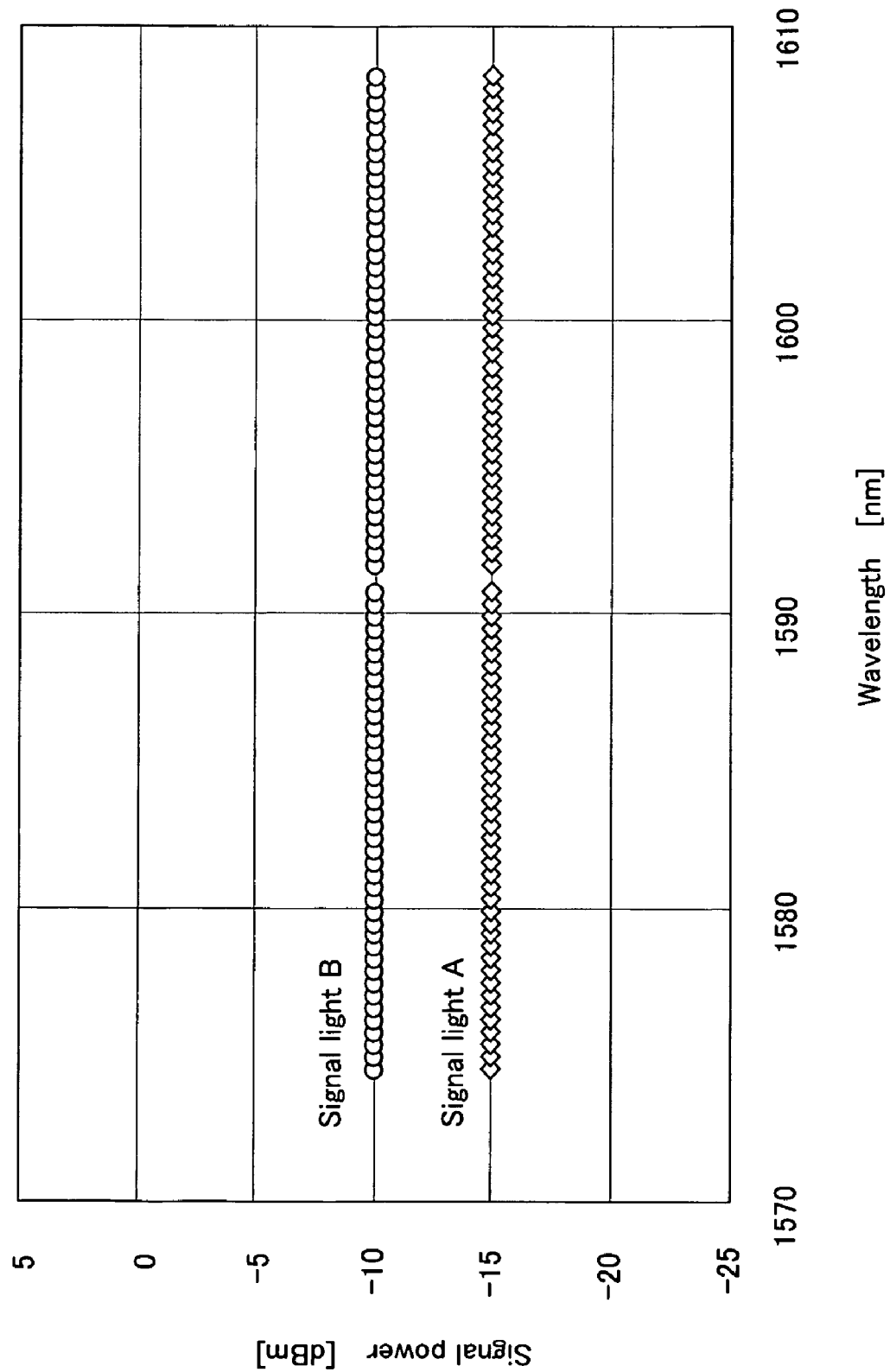
FIG. 7 shows examples of spectrums of input signals observed when input level varies.

FIG. 7 shows an example where the levels of inputted signal lights are greater due to variation in transmission-line loss and other losses than those in steady state. The signal light A is an example where the power of signal light is increased by 5 dB more than in the steady state shown in FIG. 4, similarly, the signal light B is an example by 10 dB more than that. The gains of the optical amplifying units 5a, 5b, and 5c are kept constant by AGC control here. On the other hand, the entire optical amplifier 100 is adjusted by the variable optical attenuator 1 so that the output thereof can be maintained constant. Specifically, inputted signal lights are branched in the optical branching couplers 2a and 2b respectively, levels of which are detected by PDs 3a and 3b. The control unit 6 of the variable optical attenuator controls the variable optical attenuator so that it gives a total attenuation of 5 dB based on the detected result when the signal light A is inputted. Similarly, when the signal light B is inputted, the control unit controls the attenuator so that it provides a total attenuation of 10 dB.

In the present embodiment, the optical amplifier 100 is configured so that signal light is passed through the variable optical attenuator 1 twice. For that reason, the attenuation of the variable optical attenuator 1 is set at a half of the attenuation required by the optical amplifier 100. More specifically, the attenuation is set at 2.5 dB for the signal light A, and at 5 dB for the signal light B. The control unit 6 of the variable optical attenuator controls the attenuation of the variable optical attenuator 1 so that the output ratio of the PD detector 3a to the PD detector 3b can be 2.5 dB and 5 dB.

Figure 8:
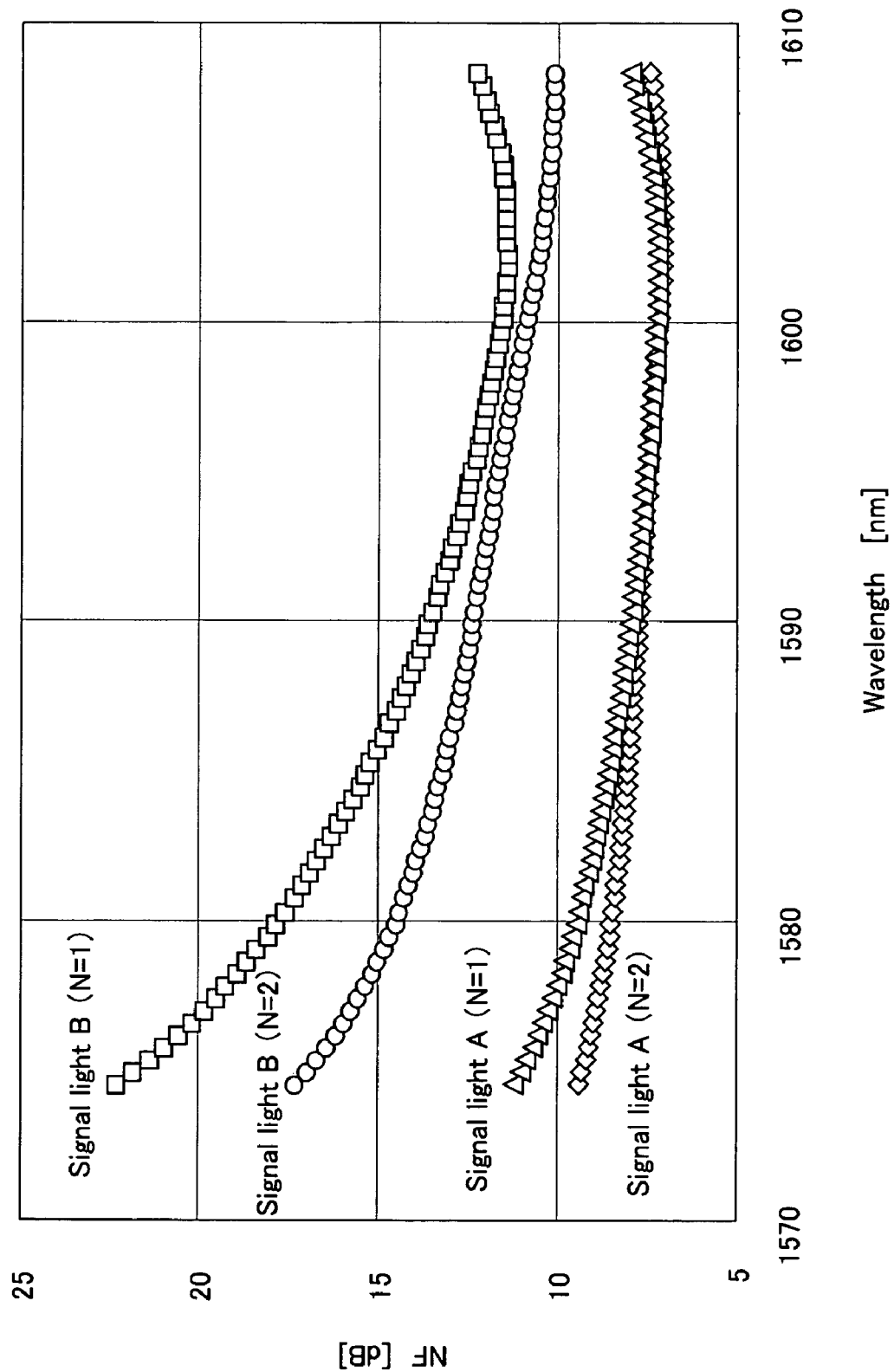
FIG. 8 shows examples of NF values with respect to wavelengths of output signals observed when input level varies.
Figure 9:
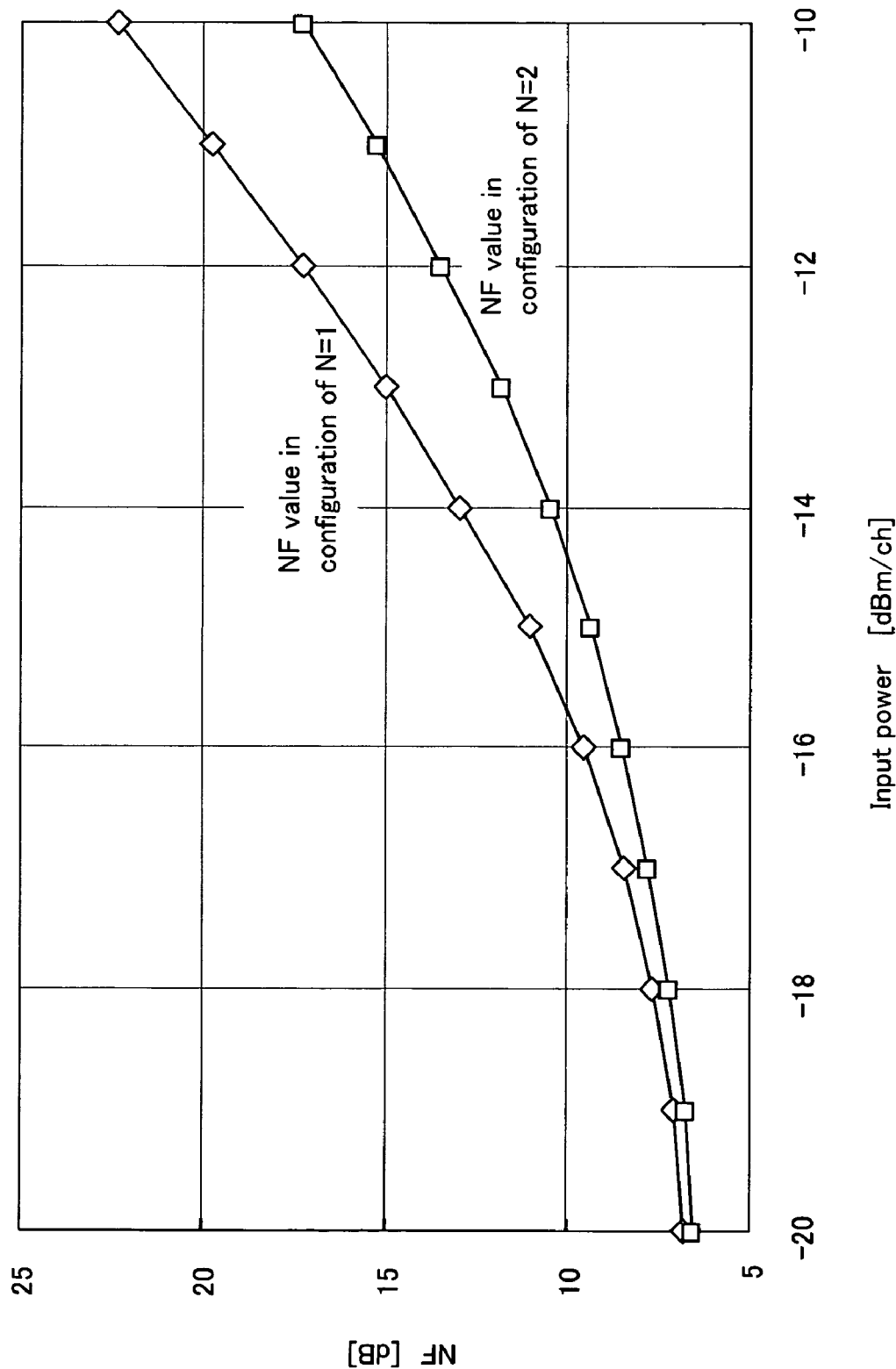
FIG. 9 shows comparison of NF values with input power.

FIG. 8 shows comparison of NF values with respect to wavelengths of amplified signals A and B in cases where the signals are passed through the variable optical attenuator twice (N=2) and once (N=1). The case of N=1 gives the same quantity of attenuation as that of N=2. These results show that passing signal light through the variable optical attenuator twice prevents optical attenuation from locally concentrating in the optical amplifier, thereby improving noise figure. FIG. 9 shows comparison of noise figures with respect to power of inputted signal light. In the present embodiment, it is proved that the greatly the input power varies, the better the noise figures are.

The input section of the optical amplifier 100 in FIG. 1 may be further provided with an optical branching coupler and PD to detect directly the level of inputted signal light.

In the configuration of the aforementioned present embodiment, the number of paths for input and output ports in the variable optical attenuator is two and the optical amplifying units have three stages. In addition, signal light is passed through the variable optical attenuator twice. However, the configuration is limited only to that. The optical amplifying unit 5a at the input side and the optical amplifying unit 5c at the output side can be omitted. In contrast to that, the numbers of the input and output ports and of stages for the optical amplifying units may be increased. Furthermore, signal light can be passed through the variable optical attenuator three times or more.

The present embodiment uses signal light with a long wavelength band (L-band), the range from 1570 nm to 1610 nm, as shown in FIGS. 4 to 8. The present invention, however, is limited to neither the wavelength band nor the number of signals in particular.

As mentioned above, the first exemplary embodiment has effects described in the following. Firstly, the variable optical attenuator is provided with a plurality of optical signal paths, through which signal lights are passed via an looped optical circuit, which can prevents local loss from concentrating. This produces an effect of suppressing deterioration of noise figure in the optical amplifier.

Secondly, in the first exemplary embodiment, attenuation is given to the input and output ports of the variable optical attenuator based on a specified ratio. In addition to the above, the substantially the same amount of attenuation is given to all input and output ports. Consequently, the monitor of one set of input and output ports makes it possible to obtain easily the sum total attenuated with the variable optical attenuator. Moreover it is easy to control the attenuator.

Thirdly, the configuration in which signal lights are passed through the same variable optical attenuator repeatedly eliminates the need for increasing the number of components and saves space for installation.

Figure 10:
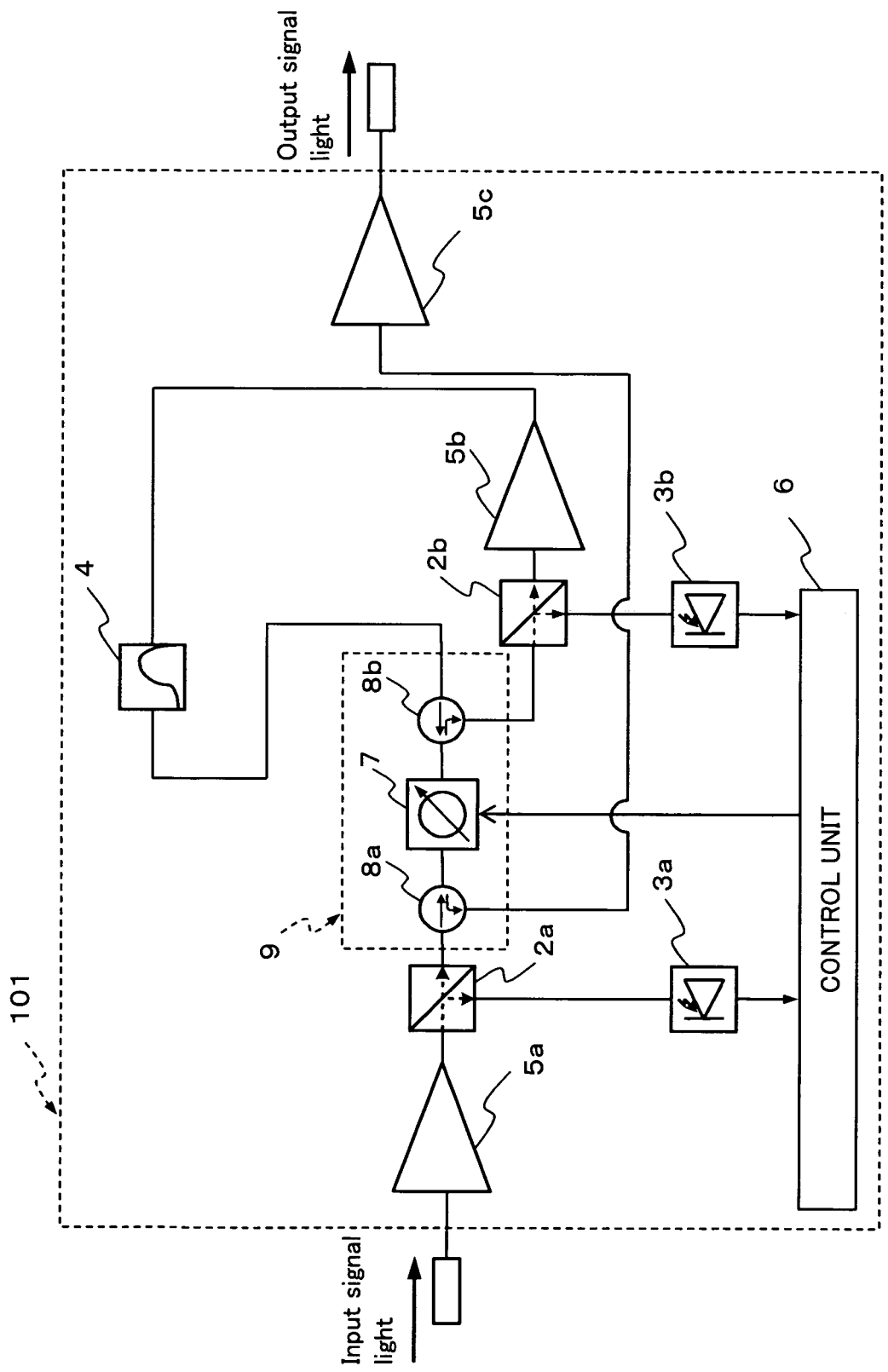
FIG. 10 shows an example of the configuration of an optical transmitting apparatus in a second exemplary embodiment of the present invention.
Figure 11:
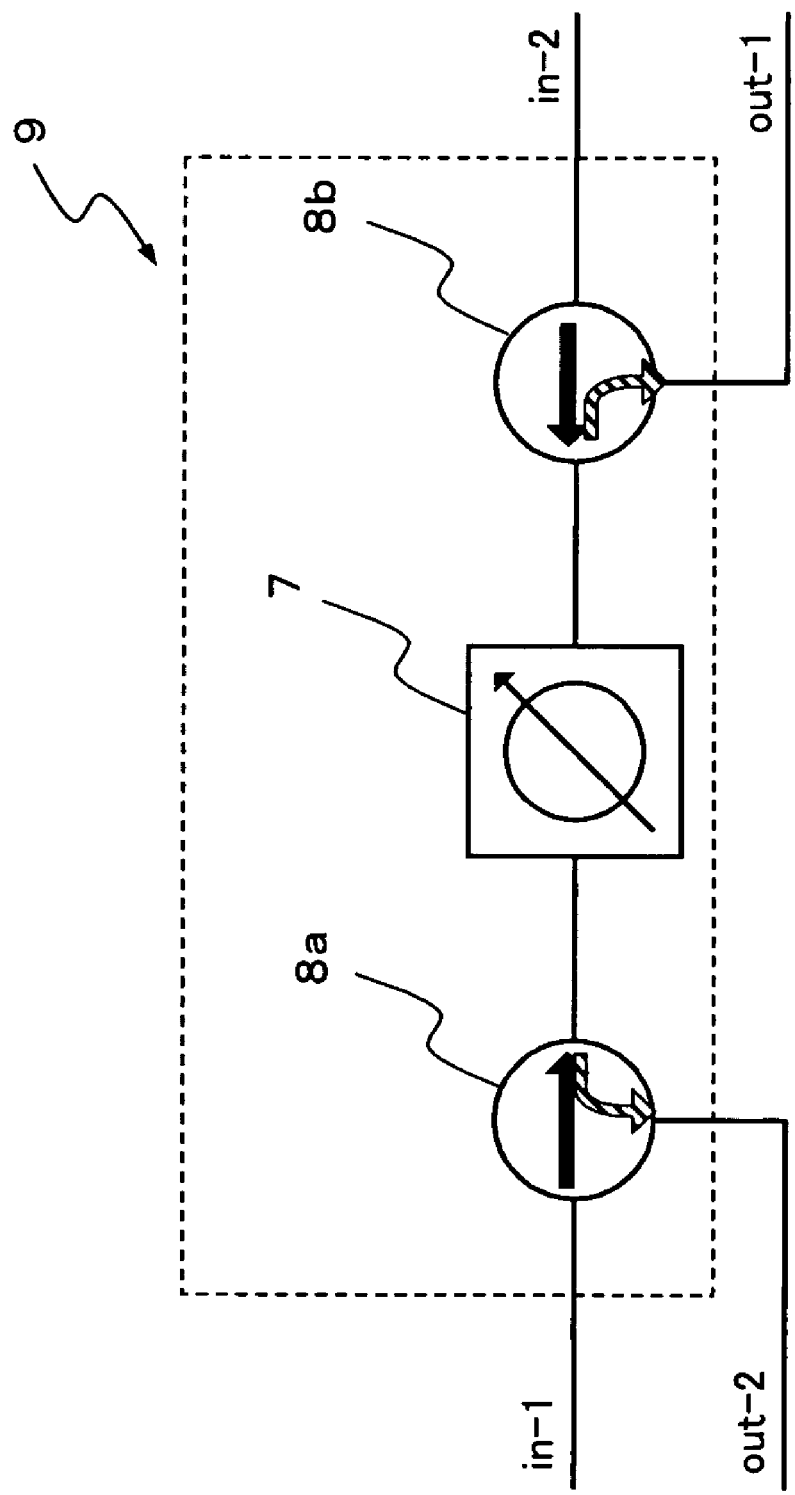
FIG. 11 shows an example of the general configuration of a variable optical attenuator used in the second exemplary embodiment.

FIG. 10 shows an example of the configuration of an optical amplifier 101 using a variable optical attenuator in a second exemplary embodiment of the present invention. FIG. 11 shows an example of the general configuration of a variable optical attenuating unit used in the second exemplary embodiment of the present invention. The following is a description with reference to these drawings. Incidentally, composing elements in FIG. 10 having the same functions as those in FIG. 1 are given the same reference characters to omit description about them.

As shown in FIG. 11, a variable optical attenuating unit 9 is composed of a variable optical attenuator 7 having a single optical signal path and two optical circulators 8a and 8b. The optical circulators 8a and 8b are connected differently to the ports depending on the direction in which light transmits. Specifically, in the variable optical attenuating unit 9, signal light inputted into the input port "in-1" is outputted to the variable optical attenuator 7 through the optical circulator 8a. The signal light is attenuated therein and outputted to the optical circulator 8b. The signal light is then outputted from the output port "out-1." On the other hand, in the variable optical attenuating unit 9, signal light inputted into the input port "in-2" is outputted to the variable optical attenuator 7 through the optical circulator 8b. The signal light is attenuated therein and outputted to the optical circulator 8a. The signal light is then outputted from the output port "out-2." This configuration, in which the variable optical attenuator 7 only with a single optical signal path, is used bidirectionally, enabling attenuation twice.

Since the entire optical amplifier 101 operates in the same manner as that in the first exemplary embodiment, description is omitted. The second exemplary embodiment also has the same effect as the first exemplary embodiment described above. The configuration is excellent in availability in that a general variable optical attenuator with only one path can be used. It is also excellent in that two-time attenuation can be equalized with ease.

Figure 12:
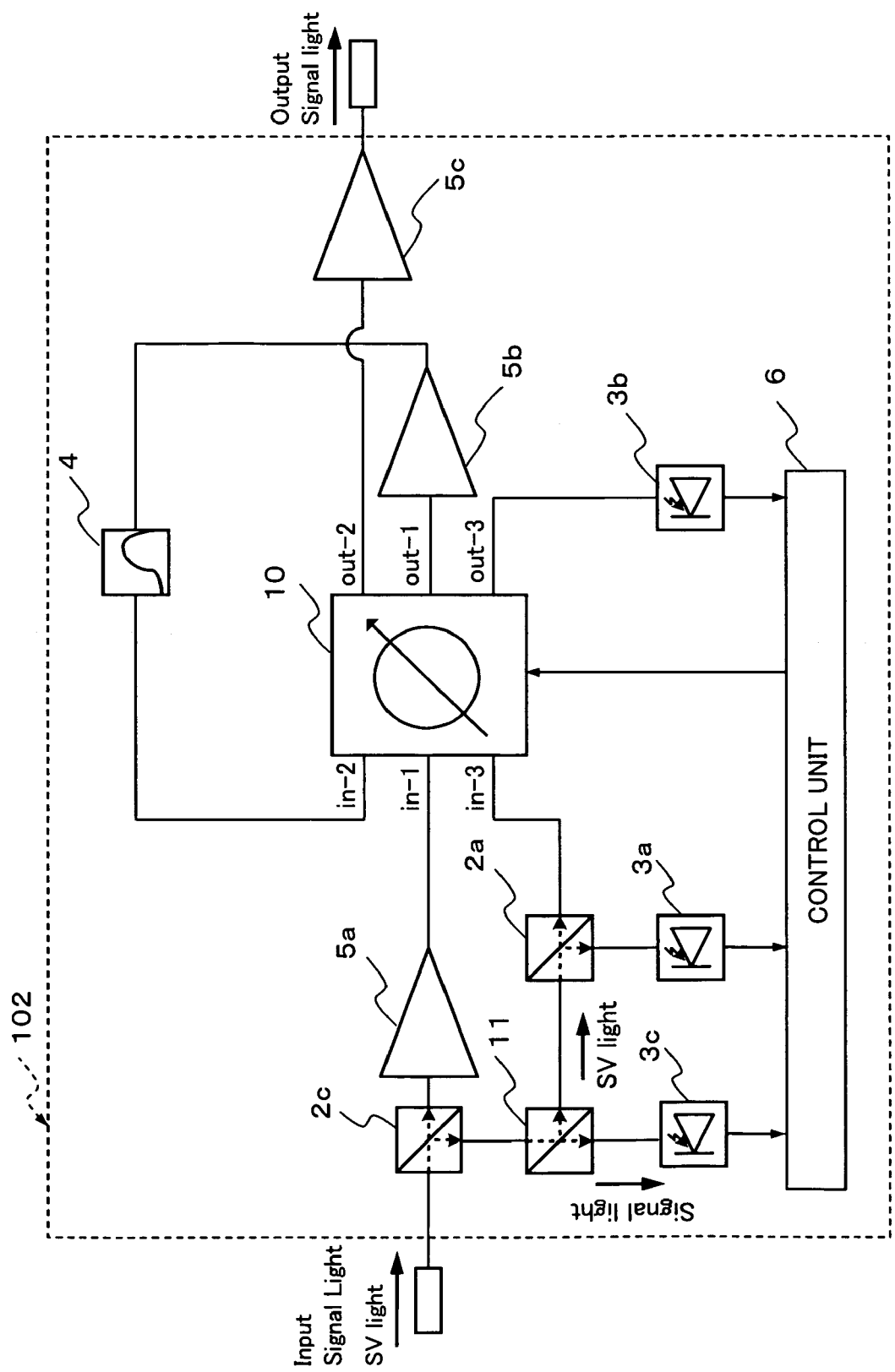
FIG. 12 shows an example of the configuration of an optical transmitting apparatus in a third embodiment of the present invention.
Figure 13:
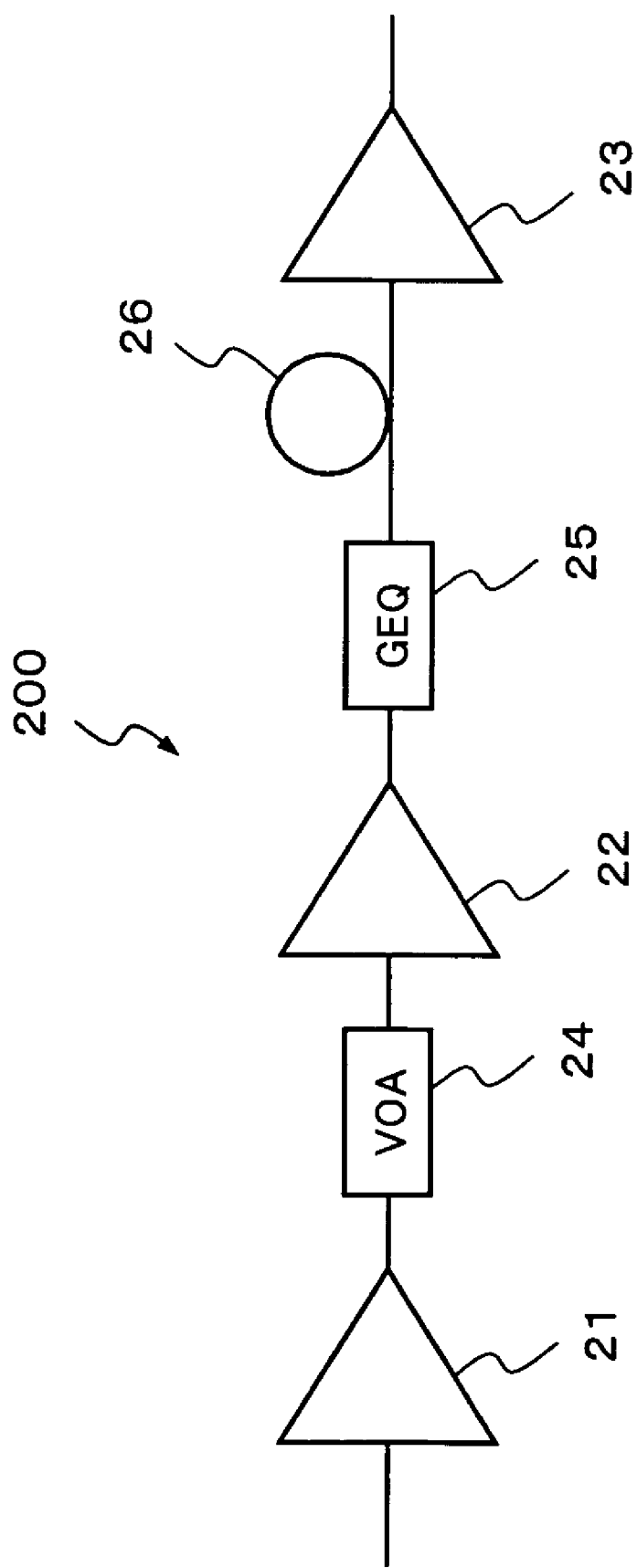
FIG. 13 shows an example of the configuration of an optical transmitting apparatus related to the present invention.
Figure 14:
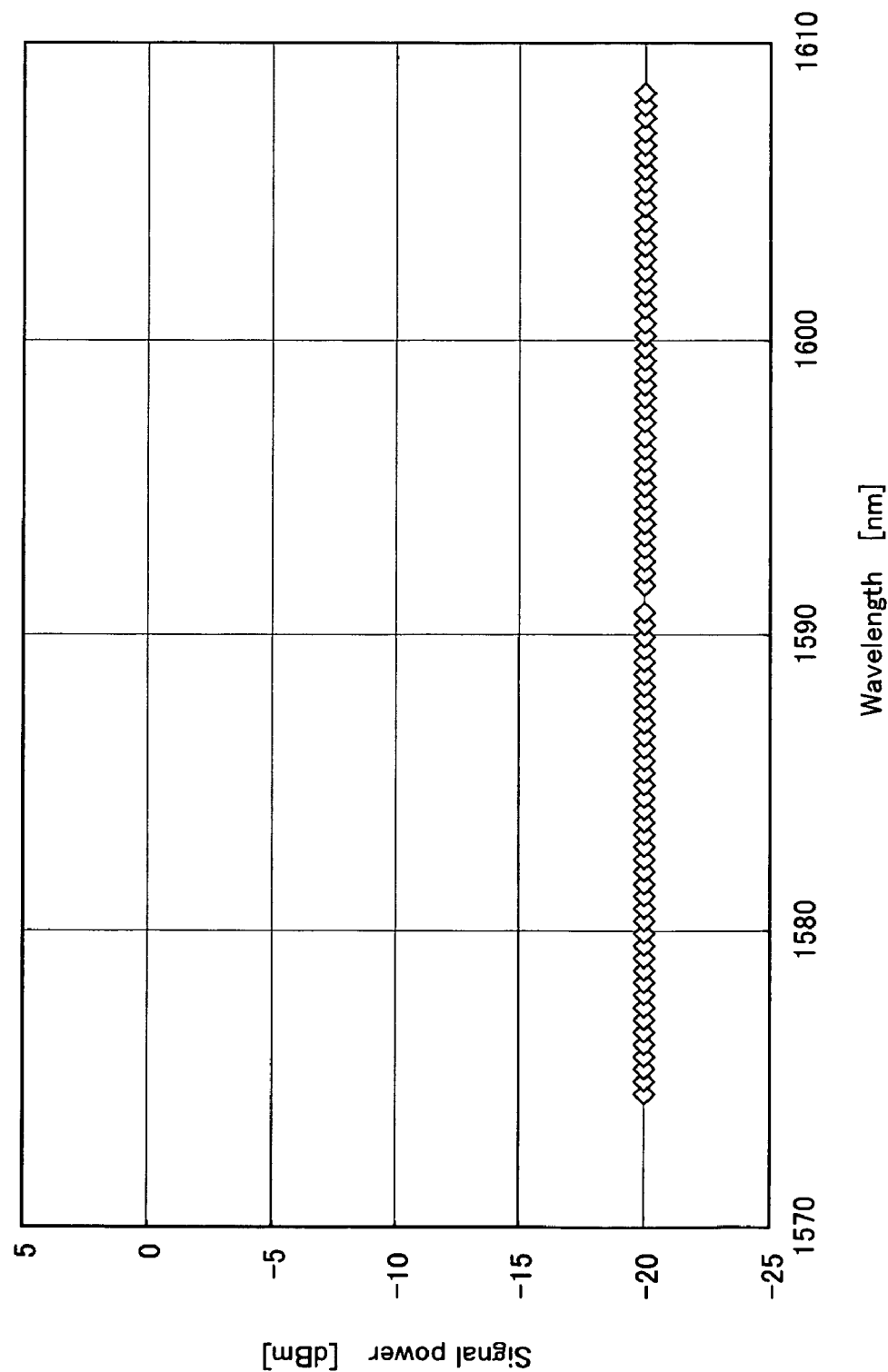
FIG. 14 shows an example of a spectrum of input signals in steady state.
Figure 15:
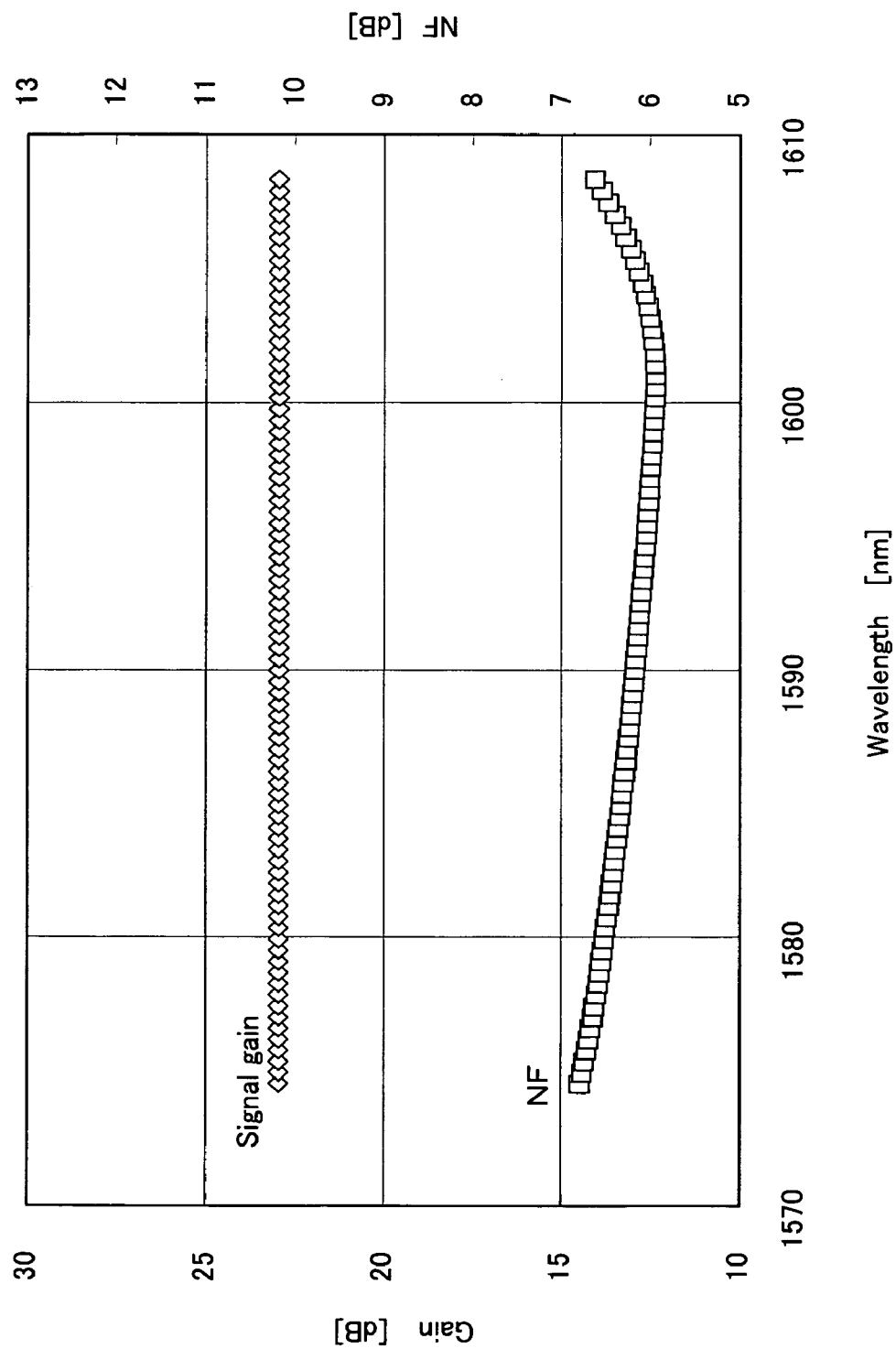
FIG. 15 shows an example of gain and NF value with respect to wavelengths of output signals in steady state.
Figure 16:
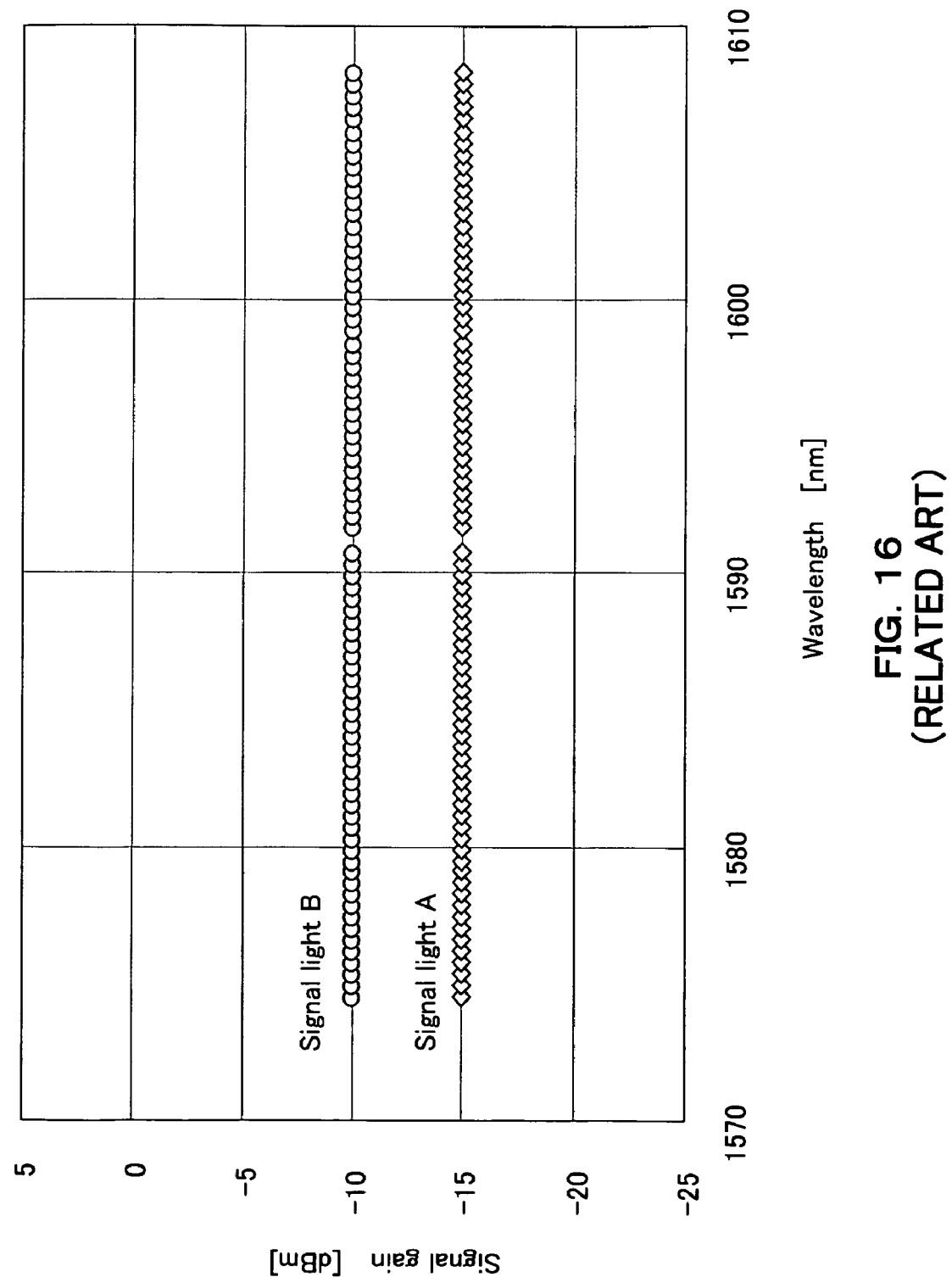
FIG. 16 shows examples of spectrums of input signals observed when input level varies.
Figure 17:
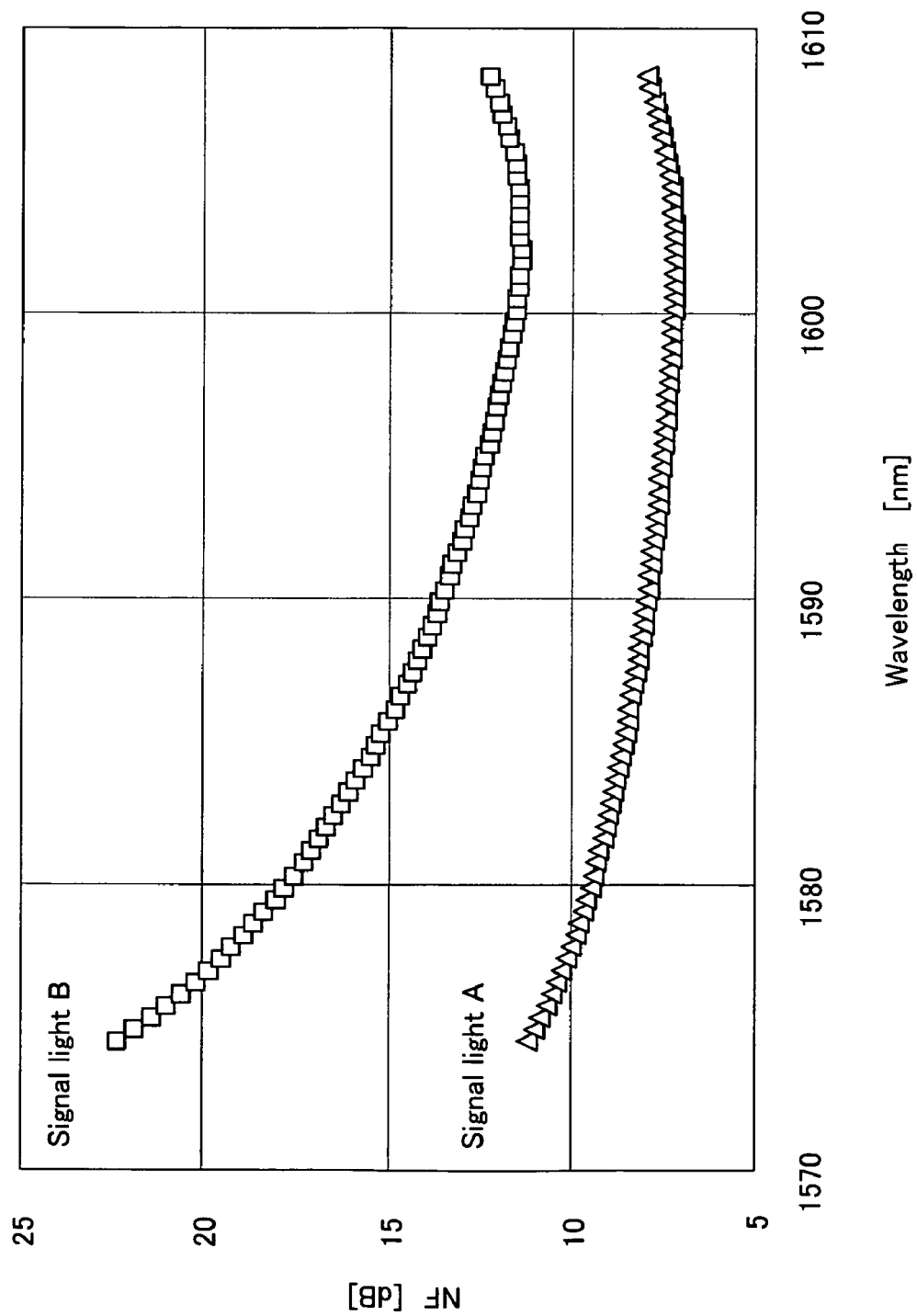
FIG. 17 shows an example of NF values with respect to wavelengths of output signals observed when input level varies.
Figure 18:
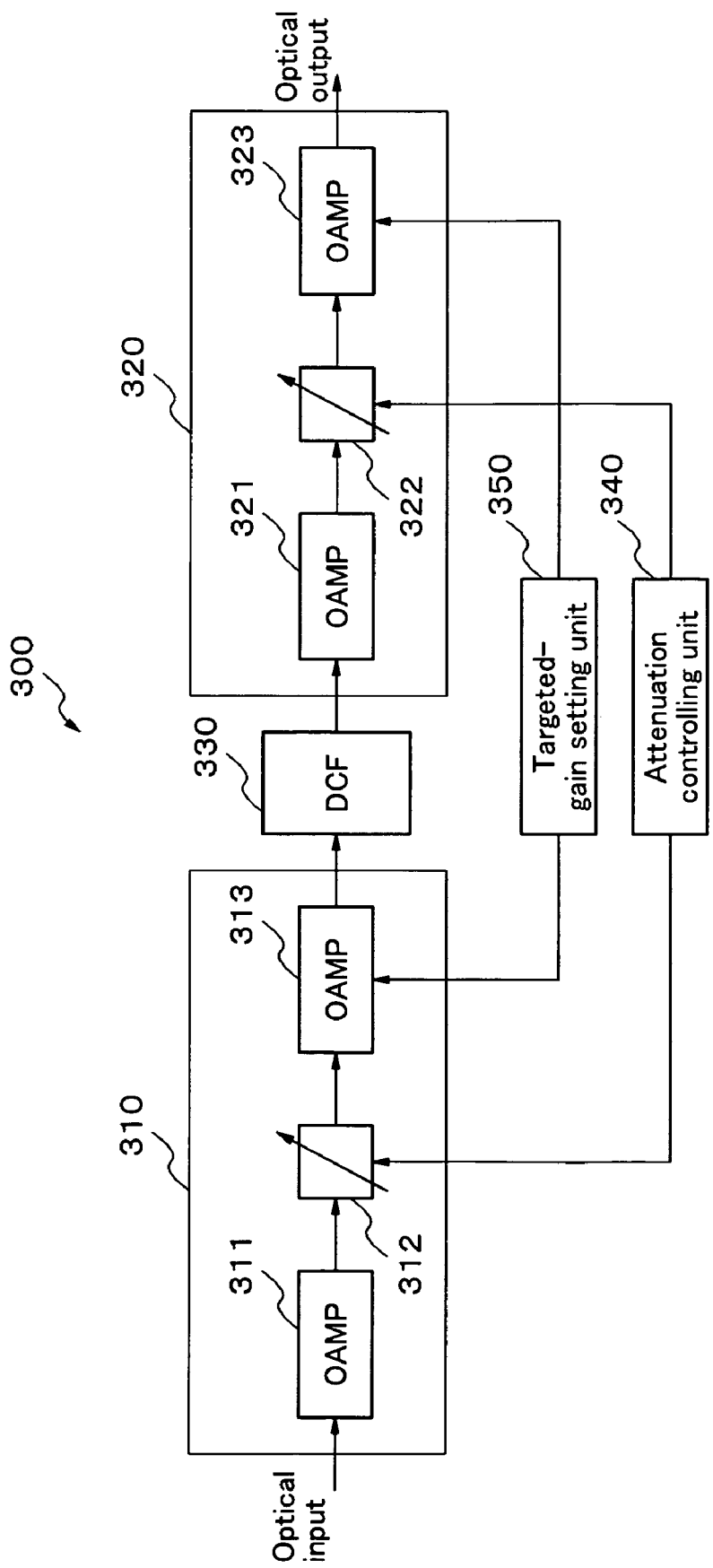
FIG. 18 shows another example of the configuration of an optical transmitting apparatus related to the present invention.

FIG. 12 shows an example of the configuration of an optical amplifier 102 using a variable optical attenuator in a third exemplary embodiment of the present invention. The following is a description with reference to this drawing. Incidentally, composing elements having the same functions as those in FIG. 1 are given the same reference characters to omit description about them.

In the configuration of the third exemplary embodiment of the present invention, the control of the variable optical attenuator is more sophisticated than that in the first exemplary embodiment in FIG. 1. Major sophisticated points include that a variable optical attenuator 10 with at least three input and output ports is used, of which one set of input and output ports is used as a dedicated port for monitor light. A supervisory (SV) light is used as the monitor light. Further, the input section includes an optical branching coupler 2c, a SV coupler 11, and a PD detector 3c. The optical branching coupler 2c branches light to be inputted into the optical amplifier 102. The SV coupler 11 demultiplexes signal light and SV light from the branched light. The PD detector 3c detects the level of the demultiplexed signal light. The SV light demultiplexed in the SV coupler 11 is further branched by the optical branching coupler 2a. One of the branched lights is led to an input port "in-3" exclusively used for SV light, the other led to the PD detector 3a. The attenuation of the variable optical attenuator 10 is adjusted by detecting the levels of signal lights at the input port "in-3" and at an output port "out-3" exclusively used for the SV light with the PD detectors 3a and 3b. The number of optical signal paths in the variable optical attenuator 10 is at least three or more (N>3). The variable optical attenuator 10 may be configured with use of the concrete examples 1 to 4 shown in the first exemplary embodiment. A control unit 6 of the variable optical attenuator controls optical attenuation in the variable optical attenuator 10 based on the detected results from the PD detectors 3a and 3b.

The operation of the third exemplary embodiment according to the present invention is described below with reference to FIG. 12. Signal light flows in substantially the same manner as that in the first exemplary embodiment, so that description is omitted here. In the following a description is made on the flow of the SV light and the control of the variable optical attenuator 10, both of which are peculiar to the third exemplary embodiment. The SV light is used to control the attenuation of the variable optical attenuator 10 in the present exemplary embodiment. First, the transmitted signal light and SV light are inputted into the optical branching coupler 2c in the optical amplifier 102. The branched signal light is then demultiplexed into the signal light and SV light with the SV coupler 11. The demultiplexed SV light is further branched by the optical branching coupler 2a. One of the branched lights is inputted into the PD 3a to detect the power of the SV light to be inputted into the variable optical attenuator 10. The other is inputted into the input port "in-3" of the variable optical attenuator 10, then attenuated, and outputted from the output port "out-3." Subsequently, it is inputted into the PD 3b, which detects the power of the SV light to be outputted from the variable optical attenuator 10. The ratio between the optical powers detected with the PDs 3a and 3b determines attenuation in the variable optical attenuator 10. The control unit 6 of the variable optical attenuator controls optical attenuation in the variable optical attenuator 10 based on the ratio between optical powers. Incidentally, the above description is made using the SV light as monitor light, however, light other than the SV light can be used as monitor light for adjusting the variable optical attenuator.

The third exemplary embodiment also has the same effect as the aforementioned first exemplary embodiment. Furthermore, in this configuration, the number of the optical branching couplers for branching signal light to be disposed along a main path can be reduced, bringing about an effect by which lose can be reduced in the optical amplifier. That also produces an effect by which excited power required in the optical amplifier can be decreased, thereby providing an effect by which noise figure is further improved.

While this invention has been described in connection with certain exemplary embodiments, it is to be understood that the subject matter encompassed by way of this invention is not be limited to those specific embodiments. On the contrary, it is intended for the subject matter of the invention to include all alternatives, modifications and equivalents as can be included within the spirit and scope of the following claims.

Further, the inventor's intent is to retain all equivalents of the claimed invention even if the claims are amended later during prosecution.

What is claimed is:

1. An optical transmitting apparatus comprising:
   a variable optical attenuating unit that attenuates signal light variably;
   an optical amplifying unit that amplifies the signal light; and
   a looped optical circuit that returns the signal light from the optical amplifying unit to the variable optical attenuating unit,
   wherein the variable optical attenuating unit further variably attenuates the returned signal light and comprises a plurality of paths and attenuates the signal light variably in each of the plurality of paths, and
   the optical transmitting apparatus configured so that light in each of the plurality of paths has the same wavelength.

2. The optical transmitting apparatus according to claim 1, wherein the variable optical attenuating unit provides attenuation based on a specified ratio every time the signal light passes therethrough.

3. The optical transmitting apparatus according to claim 2, wherein the variable optical attenuating unit provides substantially the same attenuation every time the signal light passes therethrough.

4. The optical transmitting apparatus according to claim 1 further comprising:
   a first optical detecting unit for detecting the intensity of light inputted into the variable optical attenuating unit; and
   a second optical detecting unit for detecting the intensity of light outputted from the variable optical attenuating unit,
   wherein attenuation in the variable optical attenuating unit is variably controlled based on the detected values from the first and second optical detecting units.

5. The optical transmitting apparatus according to claim 4 further comprising a variable optical attenuating control unit for controlling the variable attenuation in the variable optical attenuating unit.

6. The optical transmitting apparatus according to claim 1, wherein the input section of the optical amplifying unit is connected to one of the plurality of paths in the variable optical attenuating unit, and the output section of the optical amplifying unit is connected to another of the plurality of paths in the variable optical attenuating unit via the optical circuit.

7. The optical transmitting apparatus according to claim 1, wherein the variable optical attenuating unit provides attenuation for each of the plurality of paths based on a specified ratio.

8. The optical transmitting apparatus according to claim 7, wherein the variable optical attenuating unit provides substantially the same attenuation for each of the plurality of paths.

9. The optical transmitting apparatus according to claim 1, wherein the variable optical attenuating unit comprises single variable means on the plurality of paths.

10. The optical transmitting apparatus according to claim 9, wherein the variable means comprises a Faraday rotator.

11. The optical transmitting apparatus according to claim 9, wherein the variable means comprises a liquid crystal.

12. The optical transmitting apparatus according to claim 9, wherein the variable means comprises an optical attenuating filter.

13. The optical transmitting apparatus according to claim 1, wherein the variable optical attenuating unit passes the signal light therethrough in an opposite direction to attenuate the signal light again.

14. The optical transmitting apparatus according to claim 13, wherein the variable optical attenuating unit comprises:
   a variable optical attenuator;
   a first optical circulator connected to one side of the variable optical attenuator;
   a second optical circulator connected to the other side of the variable optical attenuator;
   a first input port and a second output port disposed at the side of the first optical circulator; and
   a second input port and a first output port disposed at the side of the second optical circulator,
   wherein the signal light inputted into the first input port is outputted from the first output port through the first optical circulator, the variable optical attenuator, and the second optical circulator, and
   wherein the signal light inputted into the second input port is outputted from the second output port through the second optical circulator, the variable optical attenuator, and the first optical circulator.

15. The optical transmitting apparatus according to claim 1, wherein a supervisory light different from the signal light is used to adjust attenuation in the variable optical attenuating unit.

16. The optical transmitting apparatus according to claim 15 further comprising:
   a supervisory optical coupler for demultiplexing the signal light and the supervisory light; and
   a supervisory light detecting unit for detecting the intensity of the supervisory light, wherein attenuation in the variable optical attenuating unit is controlled based on the intensity of the supervisory light.

17. The optical transmitting apparatus according to claim 1, wherein the variable optical attenuating unit comprises three or more paths, one of which is allocated for measuring attenuation.

18. The optical transmitting apparatus according to claim 1 further comprising an optical amplifying unit on at least one side of the input and the output of the optical transmitting apparatus.

19. The optical transmitting apparatus according to claim 18, wherein the optical amplifying unit is controlled so that the total sum of gain can be kept constant.

20. The optical transmitting apparatus according to claim 18, wherein each of the optical amplifying units is controlled by Automatic Gain Control or Automatic Level Control.

21. The optical transmitting apparatus according to claim 1 further comprising a gain equalizing unit in the optical circuit.

22. An optical transmitting apparatus comprising:

variable optical attenuating means for attenuating signal light variably;

optical amplifying means for amplifying the signal light; and looped optical transmitting means for returning the signal light from the optical amplifying means to the variable optical attenuating means, wherein the variable optical attenuating means further variably attenuates the returned signal light and comprises a plurality of light paths and attenuates the signal light variably in each of the plurality of paths, and the optical transmitting apparatus configured so that light in each of the plurality of paths has the same wavelength.

* * * * *

UNITED STATES PATENT AND TRADEMARK OFFICE
CERTIFICATE OF CORRECTION

PATENT NO. : 7,375,876 B2  Page 1 of 1
APPLICATION NO. : 11/311394
DATED : May 20, 2008
INVENTOR(S) : Fumisato Yoshida It is certified that error appears in the above-identified patent and that said Letters Patent is hereby corrected as shown below:

Column 9: Claim 1, line 13, after "so that", insert -- the signal --;
Column 12: Claim 22, line 13, after "so that", insert -- the signal --

Signed and Sealed this

Seventh Day of April, 2009

JOHN DOLL
*Acting Director of the United States Patent and Trademark Office*